(12) United States Patent
Masutani et al.

(10) Patent No.: US 7,554,634 B2
(45) Date of Patent: Jun. 30, 2009

(54) THIN FILM TRANSISTOR ARRAY SUBSTRATE, MANUFACTURING METHOD FOR THE SAME, AND TRANSFLECTIVE LIQUID CRYSTAL DISPLAY

(75) Inventors: Yuichi Masutani, Tokyo (JP); Shigeaki Noumi, Tokyo (JP); Shingo Nagano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 370 days.

(21) Appl. No.: 11/548,488

(22) Filed: Oct. 11, 2006

(65) Prior Publication Data

US 2007/0103625 A1    May 10, 2007

(30) Foreign Application Priority Data

Nov. 4, 2005    (JP)    .............................. 2005-320527

(51) Int. Cl.
*G02F 1/1335*    (2006.01)
*G02F 1/1343*    (2006.01)

(52) U.S. Cl. ............................ 349/114; 349/38; 349/39

(58) Field of Classification Search ................ None
See application file for complete search history.

(56) References Cited

U.S. PATENT DOCUMENTS

| | | | | |
|---|---|---|---|---|
| 5,920,362 | A * | 7/1999 | Lee | 349/38 |
| 6,597,413 | B2 * | 7/2003 | Kurashina | 349/39 |
| 6,927,820 | B2 | 8/2005 | Jang et al. | |
| 2003/0071930 | A1 * | 4/2003 | Nagahiro | 349/39 |
| 2005/0219451 | A1 | 10/2005 | Masutani et al. | |

FOREIGN PATENT DOCUMENTS

| | | |
|---|---|---|
| JP | 09-015644 | 1/1997 |
| JP | 10-268340 | 10/1998 |
| JP | 2000-187248 | 7/2000 |
| JP | 2001-092377 | 4/2001 |
| JP | 2002-094072 | 3/2002 |
| JP | 2002-297060 | 10/2002 |
| JP | 2003-50389 | 2/2003 |
| JP | 2003-222890 | 8/2003 |
| JP | 2004-038186 | 2/2004 |
| JP | 2004-046223 | 2/2004 |
| JP | 2004-070355 | 3/2004 |
| JP | 2004-212952 | 7/2004 |
| JP | 2004-247704 | 9/2004 |
| JP | 2005-121908 | 5/2005 |
| JP | 2005-292660 | 10/2005 |
| KR | 2004-0007999 | 1/2004 |
| KR | 2005-0036758 | 4/2005 |

* cited by examiner

*Primary Examiner*—Tina M Wong
(74) *Attorney, Agent, or Firm*—Oblon, Spivak, McClelland, Maier & Neustadt, P.C.

(57) ABSTRACT

A thin film transistor array substrate includes a reflective electrode, a storage capacitor electrode disposed below the reflective electrode with a first insulation layer interposed therebetween, a second insulation layer disposed above the reflective electrode, the second insulation layer having a contact hole in an area where the storage capacitor electrode is not disposed, a transmissive electrode electrically connected to the reflective electrode through the contact hole, and a thickness compensation pattern disposed below the reflective electrode in an area having the contact hole. The thickness compensation pattern is isolated from the storage capacitor electrode.

14 Claims, 8 Drawing Sheets

THIN FILM TRANSISTOR ARRAY SUBSTRATE, MANUFACTURING METHOD FOR THE SAME, AND TRANSFLECTIVE LIQUID CRYSTAL DISPLAY

BACKGROUND OF THE INVENTION

1. Field of the Invention

The present invention relates to a thin film transistor array substrate in which a transmissive pixel electrode and a reflective pixel electrode are disposed in each pixel and a storage capacitor electrode is disposed below the reflective pixel electrode, a method of manufacturing the same, and a transflective liquid crystal display using the same.

2. Description of Related Art

It is normally necessary for the manufacturing of a transflective liquid crystal display (LCD) to form a transmissive pixel electrode and a reflective pixel electrode. This causes an increase in the manufacturing process for a thin film transistor (TFT) array substrate. To overcome this drawback, a method of forming a reflective pixel electrode at the same time as forming a source-drain electrode from the same layer is used as described in Japanese Unexamined Patent Publication No. 2005-292660, for example.

In the case of using a source-drain electrode as a reflective pixel electrode, contact resistance between Al metal having a high reflectance and ITO used for a transmissive pixel electrode in an upper layer can be undesirably high. To avoid this, there is proposed a technique of forming the source-drain electrode in a two-layer structure composed of Al metal and Cr metal and implementing two-time exposure, halftone exposure or gray-tone exposure (referred to hereinafter as two-stage exposure) to thereby remove the Al metal in the upper layer only in the portion to be in contact with ITO.

In such a method, a resist thickness varies according to a pattern formed in a gate electrode process as an under layer of the resist, i.e. the resist thickness is small in the portion where the pattern is formed and the resist thickness is large in the portion where the pattern is not formed. The resist thickness after performing two-stage exposure varies accordingly, which causes a decrease in accuracy of the two-stage exposure. In order to allow the thickness of the resist where two-phase exposure is performed to be as uniform as possible, it is preferred to uniform the film structure of the under layer of the resist in the portion where light exposure is implemented. In the case of performing two-stage exposure on the source-drain electrode, it is preferred to leave the pattern of the gate electrode process which serves as the under layer of the light-exposed portion. For these reasons, a storage capacitor electrode 1 which is formed in the gate electrode process is placed below a contact hole 2 which is created by the two-stage exposure as shown in FIGS. 9 and 10.

However, this structure causes dielectric breakdown to occur in the gate insulation layer 4 between a reflective pixel electrode 3 and the storage capacitor electrode 1 under the contact hole 2. The dielectric breakdown tends to occur in the opening of the contact hole 2. One reason for this is as follows. A pinhole is formed in the two-phase exposed part of the resist due to the exposure energy or the resist thickness being nonuniform, and the reflective pixel electrode in this part is etched off. As a result, the insulation layer 4 is hollowed out in the contact hole formation process, causing short-circuit to occur between the transmissive pixel electrode 5 and the storage capacitor electrode 1. The storage capacitor electrode 1 and the transmissive pixel electrode 5 are thereby electrically short-circuited through the reflective pixel electrode 3, which is recognized as a luminescent spot. The luminescent spot is a major factor for reducing process yield of a liquid crystal display.

Further, if the storage capacitor electrode 1 under the contact hole 2 is hollowed out, a cell gap can be large in some portions of the reflective pixel electrode of the transflective LCD, which results in degradation in reflective optical properties.

SUMMARY OF THE INVENTION

The present invention has been accomplished to solve the above problems and an object of the present invention is thus to provide a thin film transistor array substrate capable of suppressing the occurrence of short-circuit between a storage capacitor electrode and a transmissive pixel electrode due to dielectric breakdown, a method of manufacturing the same, and a transflective liquid crystal display using the same.

According to a first aspect of the present invention, there is provided a thin film transistor array substrate including a reflective electrode, a storage capacitor electrode disposed below the reflective electrode with a first insulation layer interposed therebetween, a second insulation layer disposed above the reflective electrode, the second insulation layer having a contact hole in an area where the storage capacitor electrode is not disposed, a transmissive electrode electrically connected to the reflective electrode through the contact hole, and a thickness compensation pattern disposed below the reflective electrode in an area having the contact hole, the thickness compensation pattern being isolated from the storage capacitor electrode. This enables suppression of the occurrence of short-circuit between the storage capacitor electrode and the transmissive pixel electrode due to dielectric breakdown of the insulation layer.

According to a second aspect of the present invention, there is provided the thin film transistor array substrate of the first aspect, wherein the thickness compensation pattern has substantially the same thickness as the storage capacitor electrode. This enables an increase in patterning accuracy.

According to a third aspect of the present invention, there is provided the thin film transistor array substrate of the first aspect, wherein the thickness compensation pattern is formed of the same material as the storage capacitor electrode and disposed below the first insulation layer. This enables suppression of the occurrence of short-circuit between the storage capacitor electrode and the transmissive pixel electrode due to dielectric breakdown of the insulation layer.

According to a fourth aspect of the present invention, there is provided the thin film transistor array substrate of the first aspect, further including thin film transistors arranged in an array, wherein the thickness compensation pattern is formed of the same material as a semiconductor active layer or a laminated layer of a semiconductor active layer and an ohmic contact layer in the thin film transistors and disposed above the first insulation layer. This enables suppression of the occurrence of short-circuit between the storage capacitor electrode and the transmissive pixel electrode due to dielectric breakdown of the insulation layer.

According to a fifth aspect of the present invention, there is provided the thin film transistor array substrate of the first aspect, wherein the reflective electrode has a two-layer structure composed of a first layer and a second layer laminated on the first layer, and the second layer is removed in the area having the contact hole. This enables suppression of contact resistance between the reflective electrode and the transmissive electrode.

According to a sixth aspect of the present invention, there is provided the thin film transistor array substrate of the first aspect, wherein the storage capacitor electrode is disposed in substantially a whole area below the reflective electrode. The present invention is particularly effective in such a case.

According to a seventh aspect of the present invention, there is provided a manufacturing method for a thin film transistor array substrate including thin film transistors arranged in an array on a substrate, the method including forming a storage capacitor electrode on the substrate, forming a first insulation layer on the storage capacitor electrode, forming a thickness compensation pattern isolated from the storage capacitor electrode, above or below the first insulation layer, in an area where the storage capacitor electrode is not disposed, forming a reflective electrode above the first insulation layer and the thickness compensation pattern, forming a second insulation layer on the reflective electrode, creating a contact hole in the second insulation layer in an area where the thickness compensation pattern is formed, and forming a transmissive electrode electrically connected to the reflective electrode through the contact hole. This enables manufacture of a thin film transistor array substrate capable of suppressing the occurrence of short-circuit between the storage capacitor electrode and the transmissive pixel electrode due to dielectric breakdown of the insulation layer.

According to an eighth aspect of the present invention, there is provided the manufacturing method for a thin film transistor array substrate of the seventh aspect, wherein the thickness compensation pattern has substantially the same thickness as the storage capacitor electrode. This enables an increase in patterning accuracy.

According to a ninth aspect of the present invention, there is provided the manufacturing method for a thin film transistor array substrate of the seventh aspect, wherein the storage capacitor electrode and the thickness compensation pattern are formed of the same material at the same time below the first insulation layer. This enables suppression of an increase in manufacturing process.

According to a tenth aspect of the present invention, there is provided the manufacturing method for a thin film transistor array substrate of the seventh aspect, wherein an amorphous silicon layer or a laminated layer of an amorphous silicon layer and an ohmic contact layer of the thin film transistors and the thickness compensation pattern are formed of the same material at the same time above the first insulation layer. This enables suppression of an increase in manufacturing process.

According to an eleventh aspect of the present invention, there is provided the manufacturing method for a thin film transistor array substrate of the seventh aspect, wherein the reflective electrode has a two-layer structure composed of a first layer and a second layer laminated on the first layer, and the second layer is removed in the area having the contact hole. This enables suppression of contact resistance between the reflective electrode and the transmissive electrode.

According to a twelfth aspect of the present invention, there is provided the manufacturing method for a thin film transistor array substrate of the eleventh aspect, wherein the second layer is removed by two-stage exposure. The present invention is particularly effective in such a case.

According to a thirteenth aspect of the present invention, there is provided the manufacturing method for a thin film transistor array substrate of the seventh aspect, wherein the storage capacitor electrode is disposed in substantially a whole area below the reflective electrode. The present invention is particularly effective in such a case.

According to a fifteenth aspect of the present invention, there is provided a transflective liquid crystal display including a thin film transistor array substrate as defined in any of the first to fifth aspects. This enables provision of a high quality transflective liquid crystal display.

The present invention can provide a thin film transistor array substrate capable of suppressing the occurrence of short-circuit between a storage capacitor electrode and a transmissive pixel electrode due to dielectric breakdown, a method of manufacturing the same, and a transflective liquid crystal display using the same.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Exemplary embodiments of the present invention are described hereinafter. The explanation provided hereinbelow merely illustrates the embodiments of the present invention, and the present invention is not limited to the below-described embodiments. The description hereinbelow and the accompanying drawings are appropriately shortened and simplified to clarify the explanation.

First Embodiment

Figure 1:
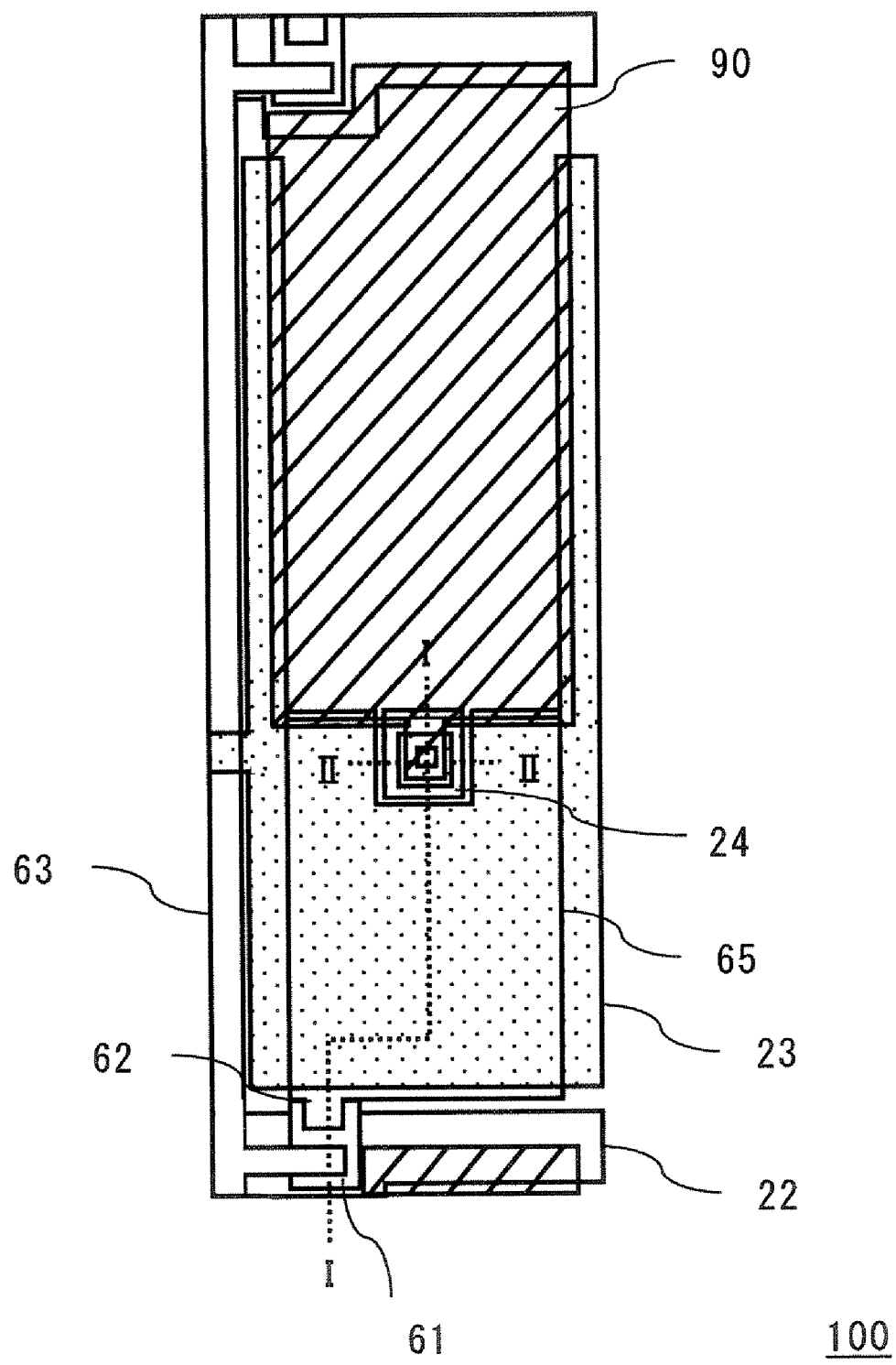
FIG. 1 is a plan view showing the structure of substantially one pixel of a thin film transistor array substrate according to a first embodiment of the invention.
Figure 2:
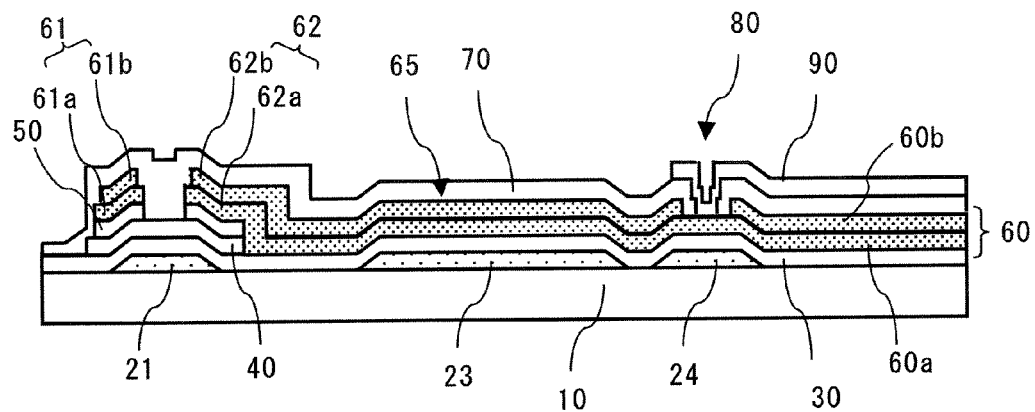
FIG. 2 is a cross-sectional view along line I-I in FIG. 1.
Figure 3:
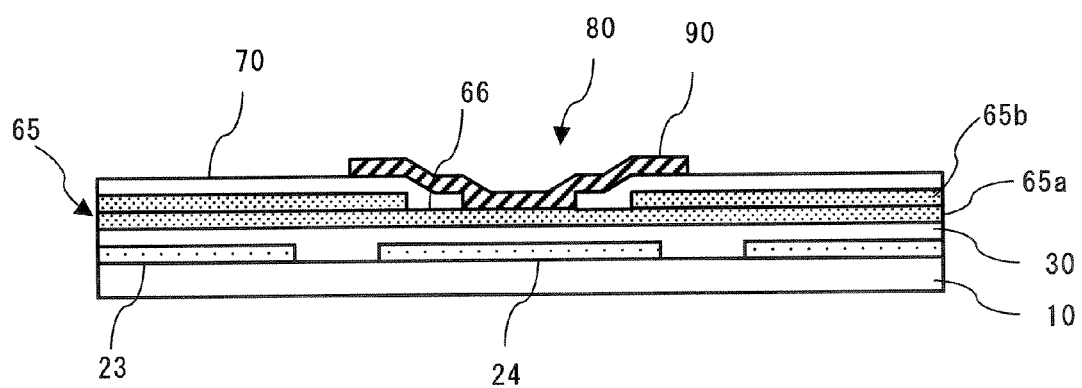
FIG. 3 is a cross-sectional view along line II-II in FIG. 1.

A thin film transistor array substrate (hereinafter referred to as the TFT array substrate) according to a first embodiment of the present invention is described hereinafter with reference to FIGS. 1 to 3. The TFT array substrate of this embodiment is used for a transflective liquid crystal display, and it includes a transmissive pixel electrode and a reflective pixel electrode. FIG. 1 is a plan view showing the structure of substantially one pixel of a TFT array substrate 100 according to this embodiment. FIG. 2 is a cross-sectional view along line I-I in FIG. 1, and FIG. 3 is a cross-sectional view along line II-II in FIG. 1. In FIGS. 1 to 3, the identical reference symbols denote identical structural elements.

As shown in FIGS. 1 and 2, a gate electrode 21, a gate line 22, and a storage capacitor electrode 23, which are formed of a first conductive layer, are formed on a transparent insulation substrate 10 such as a glass. A gate terminal is also formed on the transparent insulation substrate 10, though not shown. Formed also on the transparent insulation substrate 10 is a thickness compensation pattern 24 having substantially the same thickness as the storage capacitor electrode 23. The thickness compensation pattern 24 is disposed in the position corresponding to the area where two-time exposure, halftone exposure or gray-tone exposure, which are referred to hereinafter as two-stage exposure, is performed as described later. The thickness compensation pattern 24 is placed in the notched part of the storage capacitor electrode 23 such that it is isolated from the storage capacitor electrode 23. Thus, the thickness compensation pattern 24 is island-shaped. The thickness compensation pattern 24 may be formed of the same material as the storage capacitor electrode 23.

Figure 9:
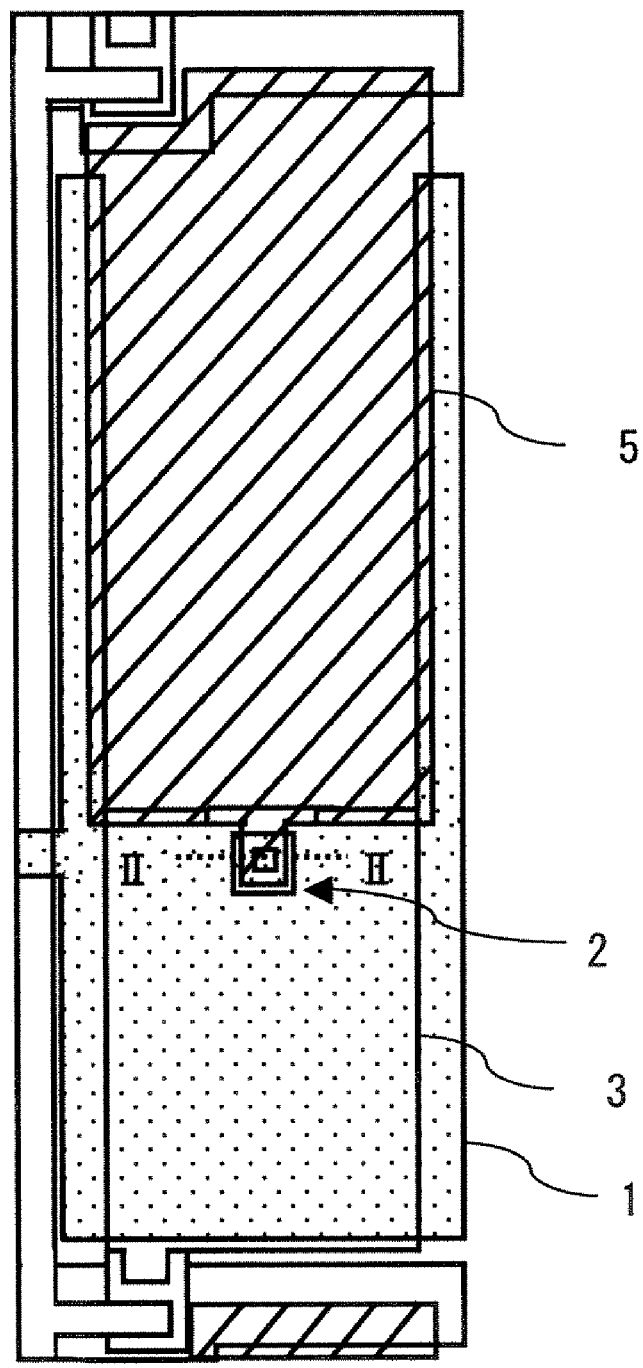
FIG. 9 is a plan view showing the structure of substantially one pixel of a thin film transistor array substrate according to a related art.

It is thus possible to separate a part of a storage capacitor electrode which is formed on substantially the whole area below a reflective pixel electrode so that it serves as the thickness compensation pattern 24. In this embodiment, the storage capacitor electrode of the related art as shown in FIG. 9 is divided by a slit-like groove into the thickness compensation pattern 24 which corresponds to the two-stage exposure area and the storage capacitor electrode 23 which corresponds to the other area. The presence of the thickness compensation pattern 24 enables an increase in patterning accuracy when performing two-stage exposure for removing a second (upper) layer 60b of a second conductive layer 60 as detailed later. Further, a gate insulation layer 30 which serves as the first insulation layer is formed to cover these elements. Thus, the thickness compensation pattern 24 is placed below the gate insulation layer 30.

Above the gate electrode 21, a semiconductor active layer 40 and an ohmic contact layer 50, which are semiconductor layers, are deposited sequentially on the gate insulation layer 30 as the first insulation layer. The center part of the ohmic contact layer 50 is removed so that the ohmic contact layer 50 is divided into two parts. Formed on one part of the ohmic contact layer 50 is a source electrode 61 formed of the second conductive layer 60. Formed on the other part of the ohmic contact layer 50 is a drain electrode 62 also formed of the second conductive layer 60. The semiconductor active layer 40, the source electrode 61 and the drain electrode 62 constitute a TFT as a switching device.

A source line 63 is formed to cross the gate line 22 with the gate insulation layer 30 interposed therebetween as shown in FIG. 1. The source electrode 61 is an extended part from the source line 63. At the crossing point of the gate line 22 and the source line 63, the semiconductor active layer 40 and the ohmic contact layer 50 are left so as to increase a withstand voltage at the crossing point, though not shown. A source terminal (not shown) is also formed of the second conductive layer 60.

The reflective pixel electrode 65 is extended from the drain electrode 62. Thus, the reflective pixel electrode 65 is formed of the second conductive layer 60, from which the source electrode 61 and the drain electrode 62 are also formed. The second conductive layer 60 has a two-layer structure composed of a lower first layer 60a where surface oxidation does not occur and an upper second layer 60b where reflectance is high. Thus, in the second conductive layer 60, the first layer 60a is in contact with the gate insulation layer 30, and the second layer 60b is a surface layer in contact with an interlayer insulation film 70. Accordingly, a source lower layer 61a, a drain lower layer 62a and a pixel electrode lower layer 65a are formed of the first layer 60a, and a source upper layer 61b, a drain upper layer 62b and the pixel electrode upper layer 65b are formed of the second layer 60b. The first layer 60a may be made of Cr, Mo, Ti, Ta, or an alloy composed mainly of those. The second layer 60b may be made of Al, Ag or an alloy composed mainly of those. The surface of the reflective pixel electrode 65 is thereby a metal film having high reflectance, which achieves high luminance in a reflection mode of a transflective liquid crystal display.

The reflective pixel electrode 65 is formed above the storage capacitor electrode 23 with the gate insulation layer 30 interposed therebetween. The storage capacitor electrode 23 is formed substantially in the whole area below the reflective pixel electrode 65. A storage capacitor is thereby formed during driving of liquid crystals, which enables suitable display. Further, the formation of the storage capacitor electrode 23 allows a part which cannot be used as a transmissive area to be used as a reflective area, which enables an increase in aperture ratio.

As shown in FIG. 2 and 3, the interlayer insulation film 70, which is a second insulation layer, is formed to cover the above-described elements. The interlayer insulation film 70 is removed partly in the area above the reflective pixel electrode 65, so that a contact hole 80 is created. In this embodiment, the contact hole 80 is created in the part slightly below the center of the pixel shown in FIG. 1. In the vicinity of the contact hole 80, a reflective pixel electrode upper layer 65b of the second conductive layer 60 which is formed in the source-drain electrode formation process is removed. The part where the reflective pixel electrode upper layer 65b is removed serves as an exposed portion 66. Thus, a reflective pixel electrode lower layer 65a is exposed at the exposed portion 66. The exposed portion 66 is formed by two-stage exposure. The exposed portion 66 allows the reflective pixel electrode 65 and a transmissive pixel electrode 90 to be in contact with each other. The pixel electrode lower layer 65a and the transmissive pixel electrode 90 are thereby electrically connected in the exposed portion 66. The removal of the pixel electrode upper layer 65b enables suppression of an increase in contact resistance between the reflective pixel electrode 65 and the transmissive pixel electrode 90.

The contact hole 80 is located above the thickness compensation pattern 24 with the gate insulation layer 30 and the reflective pixel electrode 65 placed therebetween. The width of the contact hole 80 is smaller than that of the thickness compensation pattern 24. As described above, the thickness compensation pattern 24 is isolated from the storage capacitor electrode 23. It is thereby possible to suppress the occurrence of short-circuit between the storage capacitor electrode 23 and the transmissive pixel electrode 90 due to dielectric breakdown of the gate insulation layer 30 which is likely to occur at the opening of the contact hole 80. If dielectric breakdown occurs in the gate insulation layer 30, the storage capacitor electrode 23 and the transmissive pixel electrode 90 are electrically short-circuited through the reflective pixel electrode 65, which is recognized as a luminescent spot. The luminescent spot is a major factor for reducing process yield of a liquid crystal display. This embodiment is capable of suppressing the occurrence of such short-circuit, thereby increasing process yield of a liquid crystal display. Contact holes are also formed respectively in the gate insulation layer 30 and the interlayer insulation film 70 above a gate terminal (not shown), and the interlayer insulation film 70 above a source terminal (not shown)

On the interlayer insulation film 70, the transmissive pixel electrode 90 which is formed of a conductive layer having high transmittance such as ITO is formed. The transmissive pixel electrode 90 is electrically connected to the exposed portion 66 in the reflective pixel electrode 65 through the contact hole 80 in the interlayer insulation film 70. Thus, the transmissive pixel electrode 90 is electrically connected to the drain electrode 62 through the reflective pixel electrode 65.

The pixels having the above-described structure are arranged in an array on the TFT array substrate 100. A counter substrate where counter electrodes are formed is placed opposite to the TFT array substrate 100 with liquid crystals interposed therebetween, thereby constituting a transflective liquid crystal display panel. The alignment of the liquid crystals is controlled according to a voltage applied between the reflective pixel electrode 65 and the transmissive pixel electrode 90, and the counter electrodes placed face to face thereto.

Figure 4:
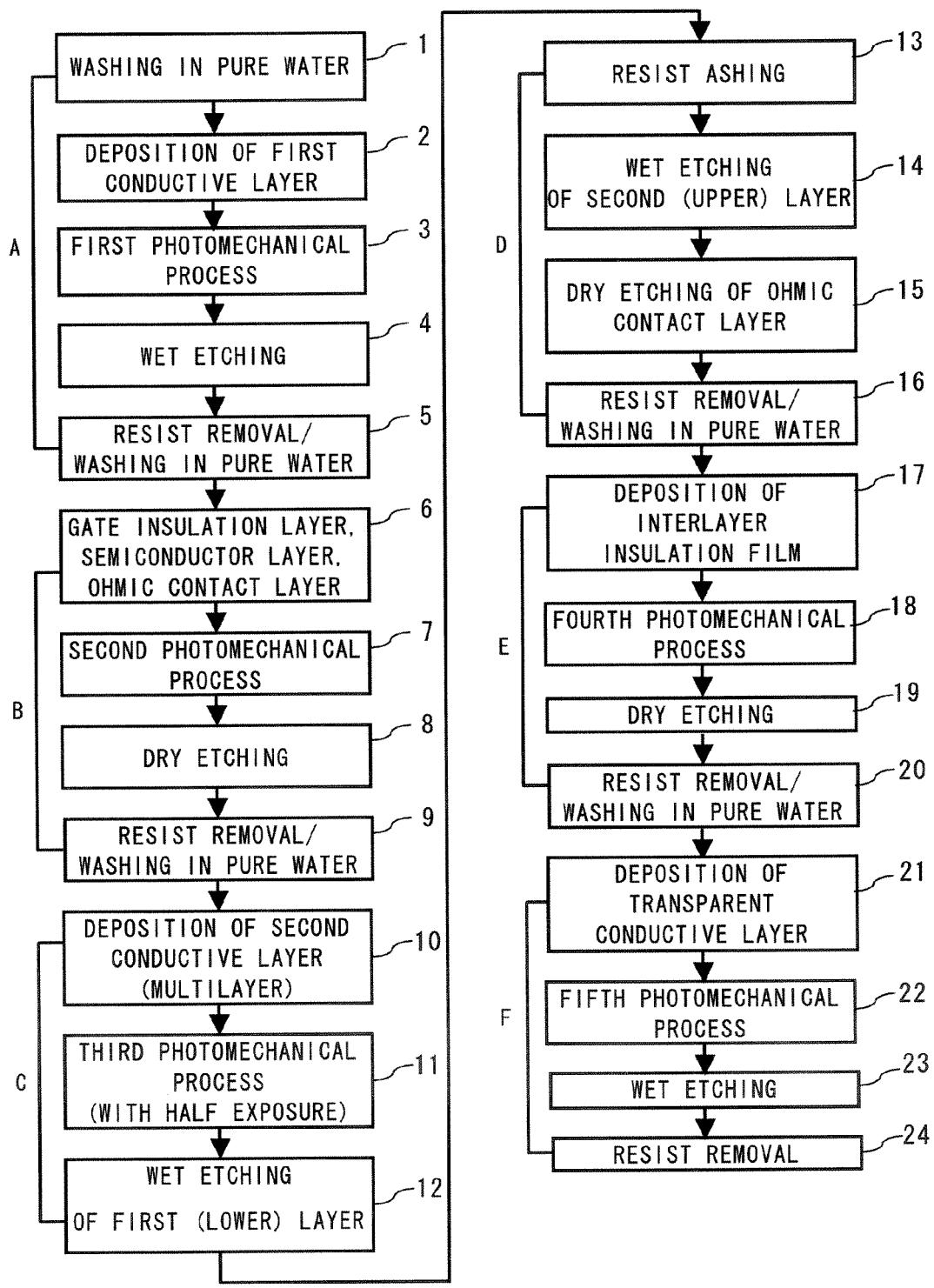
FIG. 4 is a flowchart showing a manufacturing method for the thin film transistor array substrate according to the first embodiment of the invention.

A method of manufacturing the thin film transistor array substrate 100 of a transflective liquid crystal display according to the first embodiment is described hereinafter with reference to FIG. 4. FIG. 4 is a flowchart showing the manufacturing method for the thin film transistor array substrate according to this embodiment.

Firstly, in the process A shown in FIG. 4, the gate electrode 21, the gate line 22, the storage capacitor electrode 23, and the thickness compensation pattern 24 are formed. Specifically, the transparent insulation substrate 10 such as a glass substrate is washed in pure water (Step S1). Then, the first conductive layer is deposited on the washed transparent insulation substrate 10 (Step S2). A material of a metal thin film is preferably Al or Mo metal having low electrical resistivity or an alloy composed mainly of those.

Further, first photomechanical process (Step S3) and etching (Step S4) are performed to thereby pattern the metal thin film formed on the transparent insulation substrate 10. The gate electrode 21, the gate line 22, the storage capacitor electrode 23 and the thickness compensation pattern 24 are thereby formed. The storage capacitor electrode 23 and the thickness compensation pattern 24 thus have the same thickness. After that, the resist pattern is removed and the substrate is washed in pure water (Step S5). It is thereby possible to form the thickness compensation pattern 24 without any additional manufacturing process. As described earlier, the thickness compensation pattern 24 is insulated from the storage capacitor electrode 23. The storage capacitor electrode 23 is formed in substantially the whole area below the reflective pixel electrode 65.

In a preferred example, an Al film is deposited to the thickness of 200 nm by sputtering using known Ar gas. The sputtering conditions are: in DC magnetron sputtering system, deposition power density of 3 W/cm$^2$ and Ar gas flow of 6.76*10$^{-2}$ Pa*m$^3$/s (40 sccm). Then, AlN alloy, which is Al added with Nitrogen (N), is deposited to the thickness of 50 nm by reactive sputtering using a mixture of known Ar gas and N$_2$ gas. The sputtering conditions are: deposition power density of 3 W/cm$^2$, Ar gas flow of 6.76*10$^{-2}$ Pa*m$^3$/s (40 sccm), and N$_2$ gas flow of 3.38*10$^{-2}$ Pa*m$^3$/s (20 sccm). As a result, a two-layer film made up of the Al film with the thickness of 200 nm as the lower layer and the AlN film with the thickness of 50 nm as the upper layer is obtained. The N elemental composition of the AlN film in the upper layer and the Al film in the lower layer is about 18 weight %. After that, the two-layer film is etched at a time using a solution containing known phosphoric acid and nitric acid. Then, the resist pattern is removed to thereby form the gate electrode 21, the gate line 22, the storage capacitor electrode 23 and the thickness compensation pattern 24.

Next, in the process B shown in FIG. 4, a semiconductor pattern to constitute a TFT is formed. Specifically, the gate insulation layer 30 made of silicon nitride, the semiconductor active layer 40 formed of amorphous silicon, and the ohmic contact layer 50 formed of impurity-added n$^+$ amorphous silicon are deposited sequentially (Step S6). Then, second photomechanical process (Step S7) and etching (Step S8) are performed to thereby pattern them into a prescribed shape. The resist pattern is then removed and the substrate is washed in pure water (Step S9). The semiconductor pattern is thereby obtained.

In a preferred example, a SiN film with a thickness of 400 nm as the gate insulation layer 30, an amorphous silicon film with a thickness of 150 nm as the semiconductor active layer 40, and an n$^+$ amorphous silicon film to which phosphorus (P) is added as impurity with a thickness of 30 nm as the ohmic contact layer 50, are deposited sequentially by chemical vapor deposition (CVD). Then, the amorphous silicon layer and the ohmic contact layer are etched by dry etching using known fluorine gas. After that, the resist pattern is removed, thereby obtaining the semiconductor pattern.

Then, in the process C shown in FIG. 4, the second conductive layer 60 is formed. The source electrode 61, the drain electrode 62, the source line 63, the source terminal (not shown), and the reflective pixel electrode 65 are thereby formed. The second conductive layer 60 has a two-layer structure made up of the lower first layer 60a and the upper second layer 60b. Accordingly, each electrode has a two-layer structure. Thus, specifically, the first layer 60a to serve as the drain lower layer 62a, the source lower layer 61a and the reflective pixel electrode lower layer 65a, and the second layer 60b which contains aluminum to serve as the drain upper layer 62b, the source upper layer 61b and the reflective pixel electrode upper layer 65b are deposited successively, thereby forming the second conductive layer 60 of a multi-layer with an upper layer containing aluminum (Step S10).

In a preferred embodiment, Cr is deposited to the thickness of 200 nm by sputtering using known Ar gas, and Al is also deposited in the same manner by sputtering. If it is not necessary for the drain electrode to have high reflectance, it is possible to use AlNd alloy containing Nd of 0.1 to 5 weight % instead of Al, which enables suppression of hillock growth. It is preferred to keep the space between the Cr layer and the Al layer vacuum sealed without exposure to air to suppress the growth of an oxide layer on the Cr surface which adversely affects conductivity.

After that, photosensitive resist is deposited. Then, third photomechanical process (Step S11) is performed to pattern the photosensitive resist in the area corresponding to the source electrode 61, the drain electrode 62, and the source line 63 in such a way that the photosensitive resist is thin above the exposed portion 66 where contact between the reflective pixel electrode 65 and the transmissive pixel electrode 90 is established.

Figure 5A:
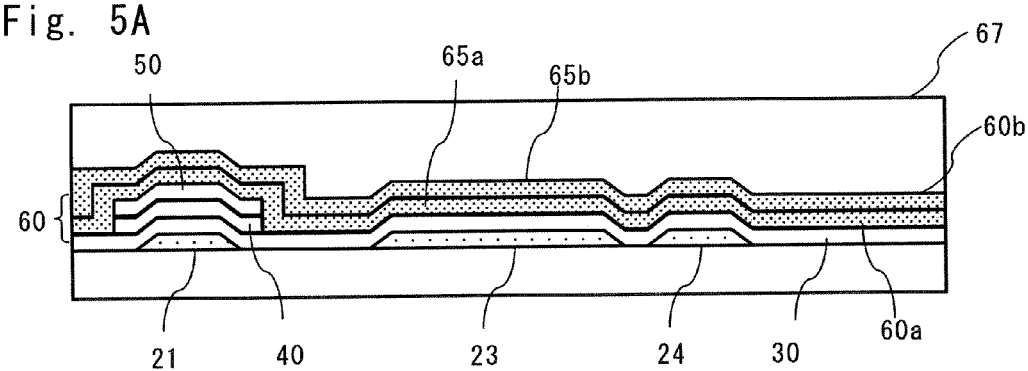
FIGS. 5A to 5D are views to describe a patterning process of a photosensitive resist in the case of implementing two-phase exposure.

A preferred example of deposition of photosensitive resist is described hereinafter with reference to FIGS. 5A to 5D. FIGS. 5A to 5D are views to describe a patterning process of photosensitive resist with two-stage exposure. In this embodiment, the case of performing two-time exposure as an example of the two-stage exposure is described. Referring first to FIG. 5A, positive resist 67 of novolac resin is deposited to the thickness of about 1.6 µm by a spin coater, and pre-bake is performed at 120° C. for about 90 seconds. In the area corresponding to TFT, the resist thickness is 1.2 µm because of a difference in the thickness of the layer underneath. In a preferred example of the third photomechanical process, first exposure is performed to thereby create a first portion 67a where the pattern of the source electrode 61, the drain electrode 62, and the source line 63 which constitute a TFT is to be formed (Step S11). The first portion 67a is an opening where the resist 67 is removed completely.

Then, the second-exposure is performed to thereby create a second portion 67b where the exposed portion 66 is to be formed. The second portion 67b is created in the position corresponding to the thickness compensation pattern 24. In the second portion 67b, the resist 67 is not completely removed but left as a thin layer. Thus, the light exposure by the second exposure is about 40% of the light exposure by the first exposure (S11).

Figure 5B:
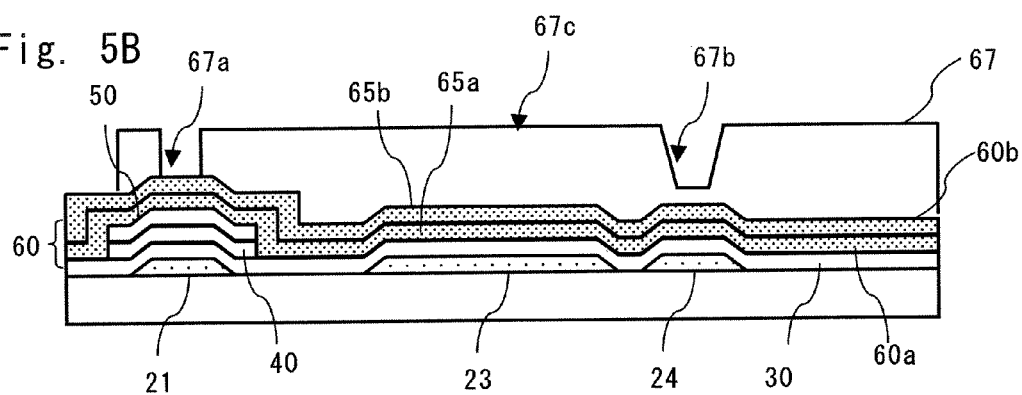

After the two-time exposure, development is performed using organic alkali developer. Then, post-bake is performed at 120° C. for about 180 seconds. As a result, a resist pattern having the first portion 67a in the position corresponding to the gate electrode 21, the second portion 67b corresponding to the exposed portion 66, and a third portion 67c having a greater thickness than the second portion 67b is formed as shown in FIG. 5B. The resist pattern which includes at least three different thicknesses is thereby formed. In the resist pattern of a preferred example, the thickness in the periphery of the first portion 67a is 1.2 μm, the thickness in the second portion 67b is 0.4 μm, and the thickness of the third portion 67c is 1.6 μm.

As described above, the storage capacitor electrode 23 and the thickness compensation pattern 24 having substantially the same thickness as the storage capacitor electrode 23 are formed below the reflective pixel electrode 65. The thickness of the layer underneath the resist is therefore uniform, which enables accurate implementation of the two-time exposure.

Though the two-time exposure is employed in this embodiment, the present invention is not limited thereto, and halftone exposure or gray-tone exposure may be employed. The halftone exposure is a technique of creating different tones to a mask by a line with an exposure resolution or less and a space pattern, dot pattern or the like. The gray-tone exposure is a technique of creating different tones to a mask by providing variation to the thickness or the quality of a material used for the mask.

For example, exposure may be performed at a time using a photomask with gray-tone or halftone which has a pattern such that the light exposure in the second portion 67b is about 40%. This enables the formation of the resist pattern having the first portion 67a, the second portion 67b and the third portion 67c. The use of gray-tone or halftone mask enables the formation of the resist pattern as shown in FIG. 5B by one-time exposure, thus allowing process simplification.

The pattern of a halftone or gray-tone photomask may be such that a filter film for reducing the transmittance of light with an exposure wavelength range (typically 350 nm to 450 nm) to about 40% is placed in the position corresponding to the second portion 67b. Alternatively, it may be a slit-like pattern formed using optical diffraction.

Figure 5C:
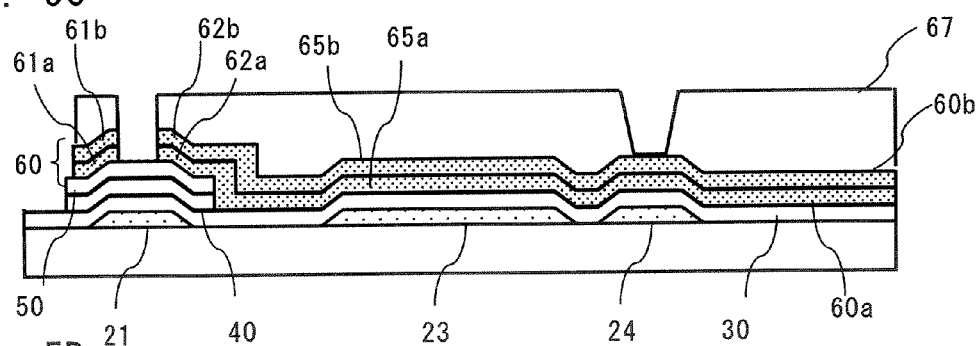

Referring then to FIG. 5B, in the state where the resist pattern has the first portion 67a, the second portion 67b and the third portion 67c, first etching is performed on the second (upper) layer 60b formed of Al using a solution containing known phosphoric acid and nitric acid. After washing in pure water and drying, the first (lower) layer 60a formed of Cr is etched away using a solution containing cerium ammonium nitrate and nitric acid (Step S12), thereby forming the drain electrode 62 and the source electrode 61. After that, resist ashing using known oxygen plasma is performed so that the resist in the second portion 67b is removed and the resist in the vicinity of the first portion 67a and the third portion 67c are left (Step S13). The resist 67 in the exposed portion 66 is thereby removed; as a result, the resist pattern is formed as shown in FIG. 5C.

Further, the part of the second layer 60b formed of Al or Al alloy which is exposed in the second portion 67b is etched away using a solution containing known phosphoric acid and nitric acid (Step S14). The reflective pixel electrode lower layer 65a is thereby exposed, thus creating the exposed portion 66. Then, the ohmic contact layer 50 formed of amorphous silicon is etched away by dry etching using known fluorine gas (Step S15) to obtain the structure shown in FIG. 5D. After that, the resist patterns 67a and 67c are removed, so that the source electrode 61, the drain electrode 62, and the exposed portion 66 are formed.

Figure 6:
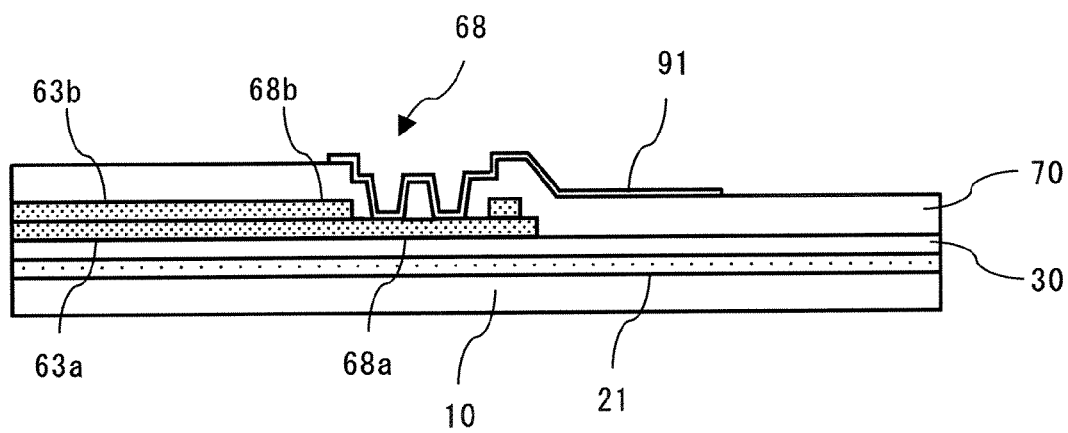
FIG. 6 is a cross-sectional view showing the structure of a source terminal.

The case of performing two-phase exposure on the exposed portion 66 where contact is made between the reflective pixel electrode 65 and the transmissive pixel electrode 90 is described above. It is possible to form an exposed portion where a source terminal lower layer 68a is exposed in a source terminal 68 in the same manner as shown in FIG. 6. In such a case, a resist pattern for creating the exposed portion for the lower layer of the source terminal 68 may be formed at the same time as forming the second portion 67b to create the exposed portion 66 described above.

Figure 5D:
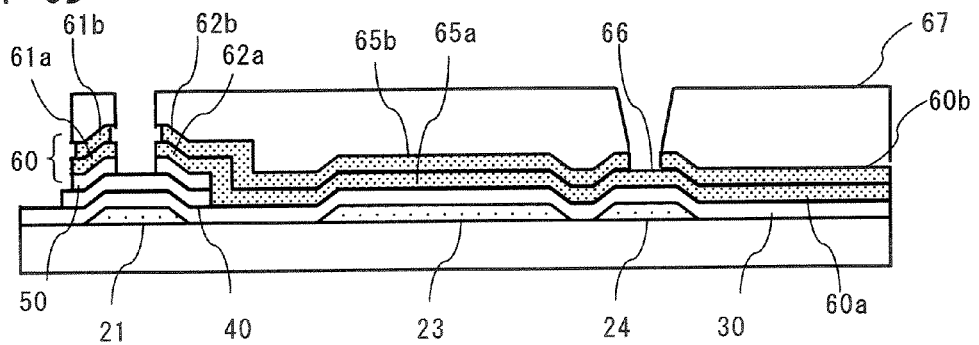

At the same as the removal of the reflective pixel electrode upper layer 65b in the second portion 67b, the source upper layer 61b and the drain upper layer 62b formed of Al or Al alloy which are exposed in the first portion 67a are etched away by isotropic etching such as wet etching (Step S14). The pattern edge of the drain upper layer 62b, which has been at the outer position than the pattern edge of the drain lower layer 62a before etching as shown in the channel region of FIG. 5C, is thereby recessed inside after etching as shown in FIG. 5D.

By the optimization of an isotropic etching time, the amount of recession can be set so that it is about equal to or less than the thickness of the drain upper layer 62b. Forming the pattern edge of the drain upper layer 62b to be close to the pattern edge of the drain lower layer 62a and to be recessed inside is difficult by normal etching. This structure enables improvement in coating property of an insulation film as detailed later and minimization of shrinking of the drain upper layer 62b, thereby suppressing an increase in line resistance. After that, dry etching is performed to remove the ohmic contact layer 50 corresponding to the first portion 67a (Step S15). Then, resist removal and washing in pure water are performed (Step S16).

The ohmic contact layer 50 is etched away immediately before the removal of the resist pattern in this embodiment. Alternatively, the etching of the ohmic contact layer 50 may be carried out before or after the resist ashing, which allows dry etching to be performed in succession, thus increasing production capacity.

Then, in the process E shown in FIG. 4, the interlayer insulation film 70 is deposited (Step S17). After that, fourth photomechanical process (Step S18) and etching (Step S19) are performed for patterning, thereby creating a contact hole 80 which reaches at least the surface of the exposed portion 66. Specifically, the contact hole 80 is crated above the thickness compensation pattern 24, the gate insulation layer 30 and the reflective pixel electrode 65. At the same time, a contact hole (not shown) which reaches the surface of the gate terminal at the end of the gate line 22 and a contact hole which reaches the surface of a terminal at the end of the source line 63 are created.

In a preferred example, a $SiO_2$ film or a SiN film are deposited to the thickness of 100 to 300 nm as the interlayer insulation film 70 by chemical vapor deposition (CVD). After forming a resist pattern, the interlayer insulation film 70 is etched by dry etching using known fluorine gas. After that, the resist pattern is removed to create the contact hole 80. It is necessary to etch both of the interlayer insulation film 70 and the gate insulation layer 30 to create the contact hole in the gate terminal. The gate insulation layer 30 may be removed in advance after the formation of the semiconductor pattern.

The interlayer insulation film 70 may be formed by depositing an organic resin film, instead of a SiN film or a SiO$_2$ film, and patterning by exposure and development. It is also possible to deposit an organic resin film on top of a SiN film and create an opening in the SiN film by dry etching or the like after performing exposure and development. It is thereby possible to uniform the height of the elements below the interlayer insulation film 70.

The contact hole 80 may reach the surface of the exposed portion 66 in such a way that at least a part of the exposed portion 66 is exposed inside the contact hole 80. Thus, an area other than the exposed portion 66 may be included or only a part of the exposed portion 66 maybe exposed inside the contact hole 80. The positioning of the opening of the contact hole 80 is therefore easy.

In FIG. 3, if the second layer 60b remains in the contact hole 80, the second layer 60b may be directly contact with the transmissive pixel electrode 90 which is formed later. However, because there is substantially no electrical conduction in a practical range, they are not regarded as being electrically connected.

As described earlier, the pattern edge of the second layer 60b may be recessed internally with respect to the pattern of the first layer 60a placed underneath by performing etching twice on the second layer 60b in the upper layer of the second conductive layer 60 in the TFT portion in this embodiment. This results in that the pattern edge of the drain upper layer 61b is at the position inner than the pattern edge of the drain lower layer 61a. Similarly, the pattern edge of the source upper layer 62b is at the position inner than the pattern edge of the source lower layer 62a. Thus, even if the thickness of the interlayer insulation film 70 is small, the coating property of the interlayer insulation film 70 is suitable in the step portions of the source electrode, the source line, and the drain electrode. This enables prevention of electric leakage to liquid crystals, improvement in coating property of EL material, and improvement in coating property of the transmissive pixel electrode at the step portion of the drain electrode.

Finally, in the process F shown in FIG. 3, a transparent conductive film is deposited as the transmissive pixel electrode 90 (Step S21). After that, fifth photomechanical process (Step S22) and etching (Step S23) are performed for patterning. The transmissive pixel electrode 90 which is electrically connected to the first layer 65a of the reflective pixel electrode 65 through the contact hole 80 is thereby formed. Further, a terminal pad (not shown) which is electrically connected to the gate terminal through a contact hole is also formed. Then, a source terminal pad 91 which is electrically connected to the exposed portion of the source terminal lower layer 68a where the source terminal upper layer 68b is removed through a contact hole is formed as shown in FIG. 6. The TFT array substrate 100 according to the first embodiment is thereby obtained.

In a preferred example, an ITO film which contains a mixture of indium oxide (In$_2$O$_3$) and tin oxide (SnO$_2$) is deposited as the transparent conductive film to the thickness of 100 nm by sputtering using known Ar gas. The film is then etched using a solution containing known hydrochloric acid and nitric acid. After that, the resist pattern is removed to thereby form the transmissive pixel electrode 90, the gate terminal (not shown), and the source terminal 68.

Though the ITO (a mixture of indium oxide and tin oxide) film is used in this embodiment, the present invention is not limited thereto, and a transparent conductive film which contains at least one of indium oxide, tin oxide, and zinc oxide may be used instead. For example, if an IZO film which is a mixture of indium oxide and zinc oxide is used, etchant may be weak acid such as oxalic acid rather than strong acid such as a mixture of hydrochloric acid and nitric acid. This is preferable when using Al alloy which is not acid resistant as gate electrode material or the second layer 60b of the second conductive layer 60 because it is possible to prevent disconnection and corrosion of the Al alloy film due to contact with the solution. Further, if the oxygen composition of a sputtering film of each of indium oxide, tin oxide and zinc oxide is smaller than theoretical chemical composition and the properties such as transmittance and resistivity are defective, sputtering gas for film deposition is preferably mixed gas of oxygen gas and H$_2$O gas instead of Ar gas alone.

In the liquid crystal display of this embodiment, the thickness compensation pattern 24 below the contact hole 80 is electrically disconnected from the storage capacitor electrode 23 and thus isolated therefrom. Therefore, even if dielectric breakdown occurs in the gate insulation layer 30 below the contact hole 80, the storage capacitor electrode 23 and the reflective pixel electrode 65 are not short-circuited. It is thereby possible to suppress the occurrence of a luminescent spot in the transflective liquid crystal display which occurs due to the dielectric breakdown. This allows the production yield of the transflective liquid crystal display to be kept high.

Further, because the thickness compensation pattern 24 is formed below the area where two-stage exposure or the like is performed, the thickness of the resist 67b in this area can be the same as the other area. This achieves both suppression of the occurrence of a luminescent spot and obtainment of a wide process margin for the two-state exposure process, thereby improving production yield of the transflective liquid crystal display.

In addition, if the storage capacitor electrode 23 below the area where two-stage exposure or the like is performed is hollowed out, a cell gap would not be uniform to cause deterioration in reflective optical properties. This embodiment places the thickness compensation pattern 24 below the reflective pixel electrode 65 so as to reduce the area of the portion with a large cell gap of the reflective pixel electrode 65 of the transflective LCD, thus allowing the cell gap to be substantially uniform. This minimizes the effect on the reflective optical properties of the transflective liquid crystal display to thereby enable high quality display.

Second Embodiment

Figure 7:
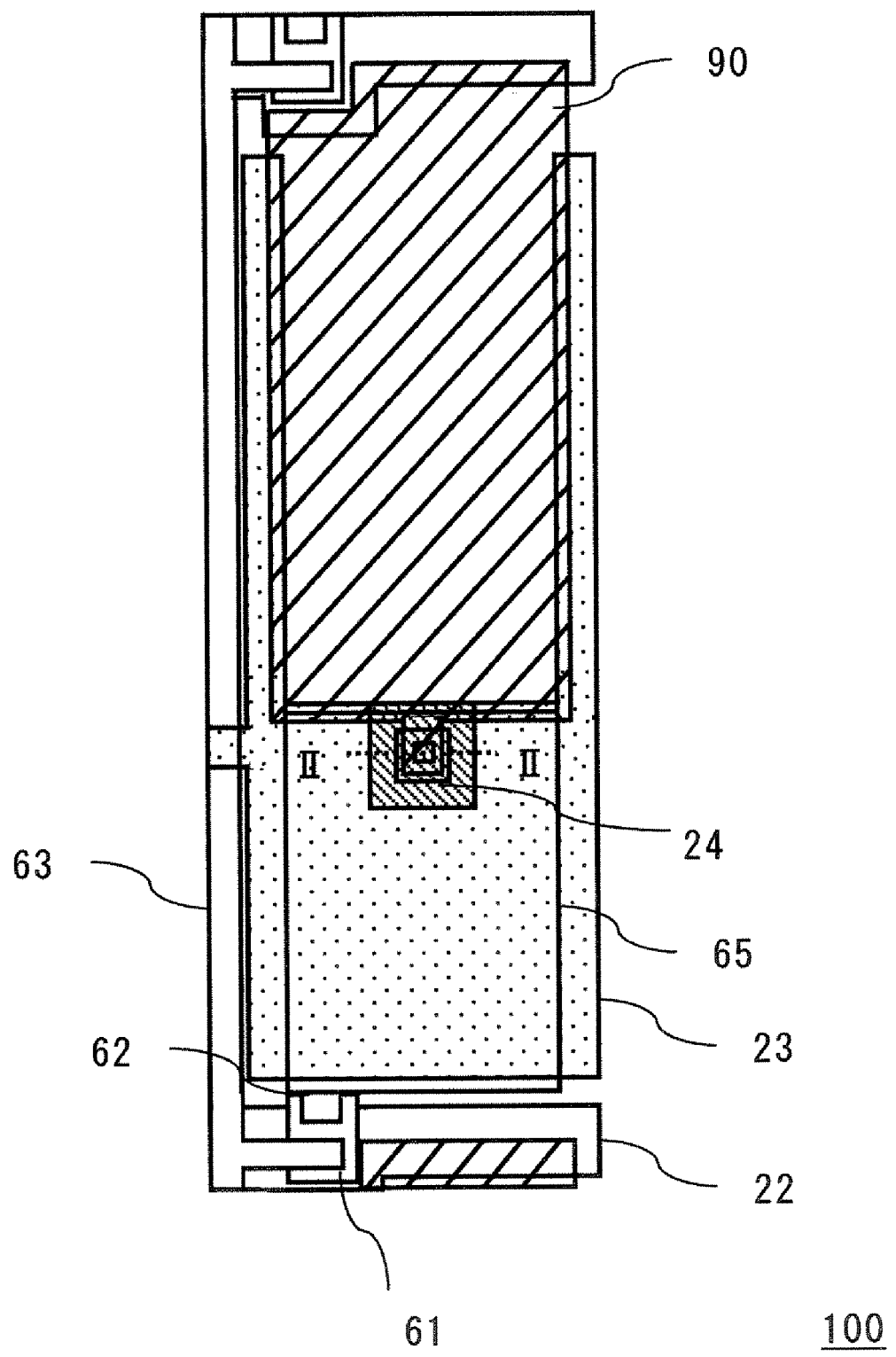
FIG. 7 is a plan view showing the structure of substantially one pixel of a thin film transistor array substrate according to a second embodiment of the invention.
Figure 8:
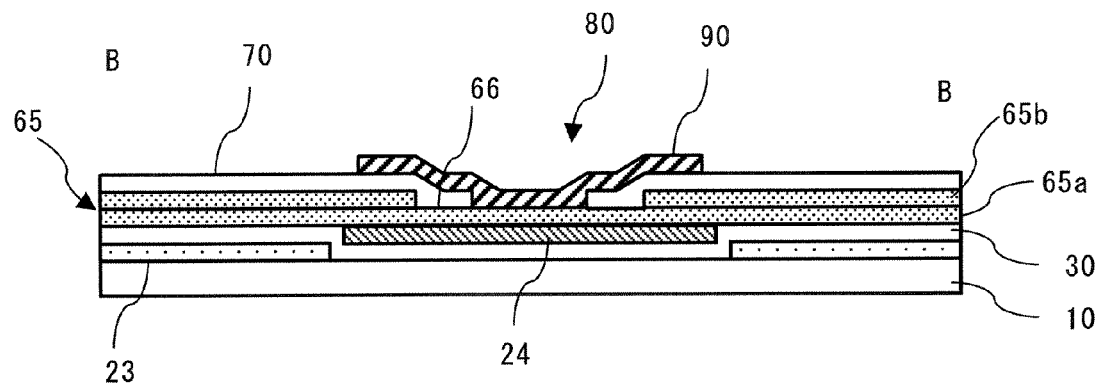
FIG. 8 is a cross-sectional view along line II-II in FIG. 7.
Figure 10:
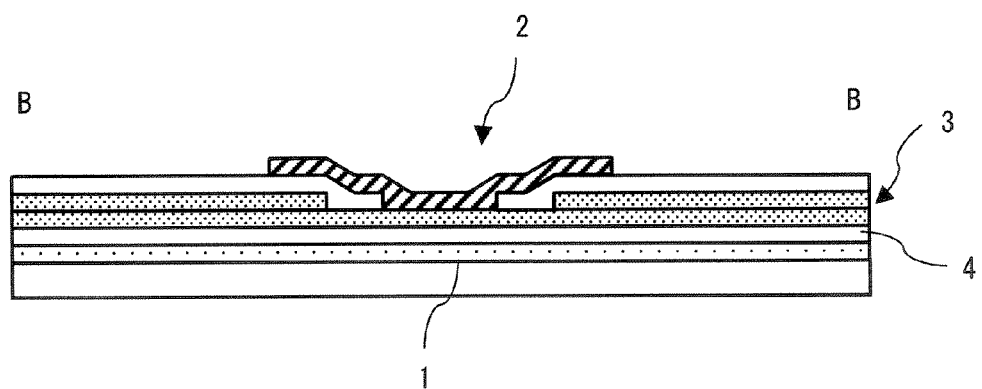
FIG. 10 is a cross-sectional view along line II-II in FIG. 9.

A TFT array substrate according to a second embodiment of the present invention is described hereinafter with reference to FIGS. 7 and 8. FIG. 7 is a plan view showing the structure of substantially one pixel of a TFT array substrate according to this embodiment. FIG. 8 is a cross-sectional view along line II-II in FIG. 7. In FIGS. 7 and 8, the identical reference symbols denote identical structural elements and redundant description is omitted. As described in the foregoing, the thickness compensation pattern 24 is formed of the same material as and in the same layer as the storage capacitor electrode 23 below the area to be two-stage exposed in the first embodiment. In this embodiment, on the other hand, the semiconductor active layer 40 and the ohmic contact layer 50, which form the semiconductor pattern, are used as the thickness compensation pattern 24.

As shown in FIGS. 7 and 8, the gate electrode 21, the gate line 22 and the storage capacitor electrode 23, which are formed of the first conductive layer, are placed on the transparent insulation substrate 10 such as glass. The part of the storage capacitor electrode 23 in the position corresponding to the area where two-stage exposure is performed is removed to create a notched portion.

The gate insulation layer 30 is formed above the gate electrode 21, the gate line 22 and the storage capacitor electrode 23. The gate insulation layer 30 is also formed above the notched portion of the storage capacitor electrode 23. Above the gate electrode 21, the semiconductor active layer 40 and the ohmic contact layer 50, which are the semiconductor layer, are laminated sequentially on the gate insulation layer 30. Above the notched portion of the storage capacitor electrode 23, the two-layer thickness compensation pattern 24 composed of the semiconductor active layer 40 and the ohmic contact layer 50 is formed on the gate insulation layer 30. Accordingly, the thickness compensation pattern 24 and the storage capacitor electrode 23 are isolated from each other by the presence of the gate insulation layer 30. The thickness compensation pattern 24 is smaller than the notched portion of the storage capacitor electrode 23 in order to prevent the thickness compensation pattern 24 and the storage capacitor electrode 23 from overlapping.

In this embodiment, the thickness compensation pattern 24 is formed not in the process A but in the process B for forming the semiconductor pattern at the same time as the formation of the semiconductor pattern.

The thickness of the thickness compensation pattern 24 is preferably substantially the same as the thickness of the storage capacitor electrode 23. Thus, the layer thickness is determined so that a total thickness of the semiconductor active layer 40 and the ohmic contact layer 50 and the thickness of the storage capacitor electrode are substantially equal. This enables an increase in patterning accuracy in the two-stage exposure to remove the second layer 60b in the upper layer of the second conductive layer 60. The thickness compensation pattern 24 may be formed of one layer of the semiconductor active layer 40.

As shown in FIGS. 7 and 8, the interlayer insulation film 70 is formed to cover the above-described components. The interlayer insulation film 70 is removed partly above the reflective pixel electrode 65 to create the contact hole 80. In the vicinity of the contact hole 80, the exposed portion 66 where Al metal which is formed by two-stage exposure is removed above the reflective pixel electrode 65 formed in the source-drain electrode formation process.

The contact hole 80 is formed above the thickness compensation pattern 24 with the reflective pixel electrode 65 placed therebetween. The width of the contact hole 80 is smaller than that of the thickness compensation pattern 24. As described earlier, the thickness compensation pattern 24 is isolated from the storage capacitor electrode 23. It is thereby possible to suppress the occurrence of short-circuit between the storage capacitor electrode 23 and the transmissive pixel electrode 90 which is likely to occur in the opening of the contact hole 80 due to dielectric breakdown of the gate insulation layer 30.

In the first embodiment, the width of the notched portion of the storage capacitor electrode 23 depends on a pattern rule, and a certain space exists between the storage capacitor electrode 23 and the thickness compensation pattern 24. In this embodiment, on the other hand, the thickness compensation pattern 24 is formed of a different layer from the storage capacitor electrode 23, and therefore a space between the storage capacitor electrode 23 and the thickness compensation pattern 24 can be small. This enables reduction in the area with a large cell gap, achieving more suitable reflective display characteristics. Further, because the storage capacitor electrode 23 is not placed below the contact hole 80, it is possible to effectively prevent a point defect which occurs under the contact hole 80 due to dielectric breakdown of the gate insulation layer 30, thus improving the production yield of the liquid crystal display.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A thin film transistor array substrate comprising:
a reflective electrode;
a storage capacitor electrode disposed below the reflective electrode with a first insulation layer interposed therebetween;
a second insulation layer disposed above the reflective electrode, the second insulation layer having a contact hole in an area where the storage capacitor electrode is not disposed;
a transmissive electrode electrically connected to the reflective electrode through the contact hole; and
a thickness compensation pattern disposed below the reflective electrode in an area having the contact hole, the thickness compensation pattern being isolated from the storage capacitor electrode.

2. The thin film transistor array substrate according to claim 1, wherein the thickness compensation pattern has substantially the same thickness as the storage capacitor electrode.

3. The thin film transistor array substrate according to claim 1, wherein the thickness compensation pattern is formed of the same material as the storage capacitor electrode and disposed below the first insulation layer.

4. The thin film transistor array substrate according to claim 1, further comprising:
thin film transistors arranged in an array, wherein
the thickness compensation pattern is formed of the same material as a semiconductor active layer or a laminated layer of a semiconductor active layer and an ohmic contact layer disposed in the thin film transistors and disposed above the first insulation layer.

5. The thin film transistor array substrate according to claim 1, wherein
the reflective electrode has a two-layer structure composed of a first layer and a second layer laminated on the first layer, and
the second layer is removed in the area having the contact hole.

6. The thin film transistor array substrate according to claim 1, wherein the storage capacitor electrode is disposed in substantially a whole area below the reflective electrode.

7. A transflective liquid crystal display comprising a thin film transistor array substrate as defined in claim 1.

8. A manufacturing method for a thin film transistor array substrate including thin film transistors arranged in an array on a substrate, the method comprising:
forming a storage capacitor electrode on the substrate;
forming a first insulation layer on the storage capacitor electrode;

forming a thickness compensation pattern isolated from the storage capacitor electrode, above or below the first insulation layer, in an area where the storage capacitor electrode is not disposed;

forming a reflective electrode above the first insulation layer and the thickness compensation pattern;

forming a second insulation layer on the reflective electrode;

creating a contact hole in the second insulation layer in an area where the thickness compensation pattern is formed; and forming a transmissive electrode electrically connected to the reflective electrode through the contact hole.

9. The manufacturing method for a thin film transistor array substrate according to claim 8, wherein the thickness compensation pattern has substantially the same thickness as the storage capacitor electrode.

10. The manufacturing method for a thin film transistor array substrate according to claim 8, wherein the storage capacitor electrode and the thickness compensation pattern are formed of the same material at the same time below the first insulation layer.

11. The manufacturing method for a thin film transistor array substrate according to claim 8, wherein an amorphous silicon layer or a laminated layer of an amorphous silicon layer and an ohmic contact layer of the thin film transistors and the thickness compensation pattern are formed of the same material at the same time above the first insulation layer.

12. The manufacturing method for a thin film transistor array substrate according to claim 8, wherein the reflective electrode has a two-layer structure composed of a first layer and a second layer laminated on the first layer, and the second layer is removed in the area having the contact hole.

13. The manufacturing method for a thin film transistor array substrate according to claim 12, wherein the second layer is removed by two-stage exposure.

14. The manufacturing method for a thin film transistor array substrate according to claim 8, wherein the storage capacitor electrode is disposed in substantially a whole area below the reflective electrode.

* * * * *